Oct. 1, 1957   F. W. STEIN ET AL   2,808,582
PHOTOELECTRIC ATTACHMENT FOR SCALES AND THE LIKE
Filed May 3, 1956   2 Sheets-Sheet 2

INVENTORS.
Frederick W. Stein
Elbert L. Blair
BY
Thos. E. Scofield
ATTORNEY.

United States Patent Office 2,808,582
Patented Oct. 1, 1957

2,808,582

PHOTOELECTRIC ATTACHMENT FOR SCALES AND THE LIKE

Frederick W. Stein, Atchison, Kans., and Elbert L. Blair, Rushville, Mo.

Application May 3, 1956, Serial No. 582,588

5 Claims. (Cl. 340—282)

The present invention relates in general to weighing scales, and it deals more particularly with large, beam-type scale installations wherein the weighing platform and the beam-balancing mechanism are separated in location, as where the latter is in a weighmaster's building and the platform is outdoors adjoining the building.

Scales of this type are used, for example, in weighing herds of livestock as they are received at the stockyards. For obvious reasons, when any farmer's herd is being weighed, his presence at the platform ordinarily is necessary or at least highly desirable in order that he may assist in keeping the animals properly stationed on the platform and reasonably calm in the face of the strange surroundings. Being thus engaged, he naturally is in no position to closely observe the balancing of the scale beam as this is carried out in the weighmaster's building. It is not entirely surprising, therefore, that disputes sometimes arise as to the accuracy of the weighing.

In an effort to minimize this difficulty, it is a common practice to equip the beam balancing mechanism with a movable pointer which is visible through a window of the weighmaster's building, the pointer being arranged to assume a vertical position when the scale is in position and to move to the left or right of vertical when it is out of balance. One such arrangement is shown in Spinks Patent 1,576,375 granted March 9, 1926. Provision of a pointer-type indicator of this kind is of some help, but situations inevitably arise which make it impossible for everyone interested in the weighing to observe the pointer at the same time, and, accordingly, such devices do not entirely eliminate the problem.

An object of the present invention, therefore, is to provide a remote signalling attachment capable of giving, at the scale platform and/or any other desired location, an unmistakable indication of whether the scale is or is not in balance.

Another object is to provide a remote indicator of the character mentioned, which does not depend for its action upon moving parts or any mechanical linkage between the scale and the indicator proper. More particularly, it is an object of the invention to provide a compact unitary device which can be quickly and easily installed on existing scales without any alteration of the latter and which requires only simple electrical connections between itself and the indicators at the desired location or locations.

According to our invention, the indication of whether the scale is or is not in balance can be given at a single remote location or can very easily be given simultaneously at as many locations as desired. The indicators at any location can take the form of lamps or other visual signals; or they can be bells, buzzers or any suitable form of audible signal. Where multiple indications are desired at different locations, different forms of indicator may be employed at the respective locations.

A feature of the invention resides in providing a unitary device readily mountable on the housing of a scale pointer, which device has a self-contained optical system including a light-sensitive cell and a source of light, the two being so related as to be controlled by the pointer passing therebetween. In this connection, another object of the invention is to provide a device of this kind attachable to the exterior of a pointer housing without its presence interfering with the normal observation of the pointer movements and scale readings.

Other objects of the invention, together with the features of novelty whereby the objects are achieved will appear in the course of the following description.

In the accompanying drawings which form a part of the specification and are to be read in conjunction therewith, and in which like reference numerals are employed to indicate like parts of the various views:

Fig. 3 is a view partly in elevation and partly in section taken from the right-hand side of Fig. 2 looking toward the left;

Fig. 4 is a fragmentary side elevational view taken from the left-hand side of Fig. 2, parts having been broken away for purposes of illustration.

Figure 2:
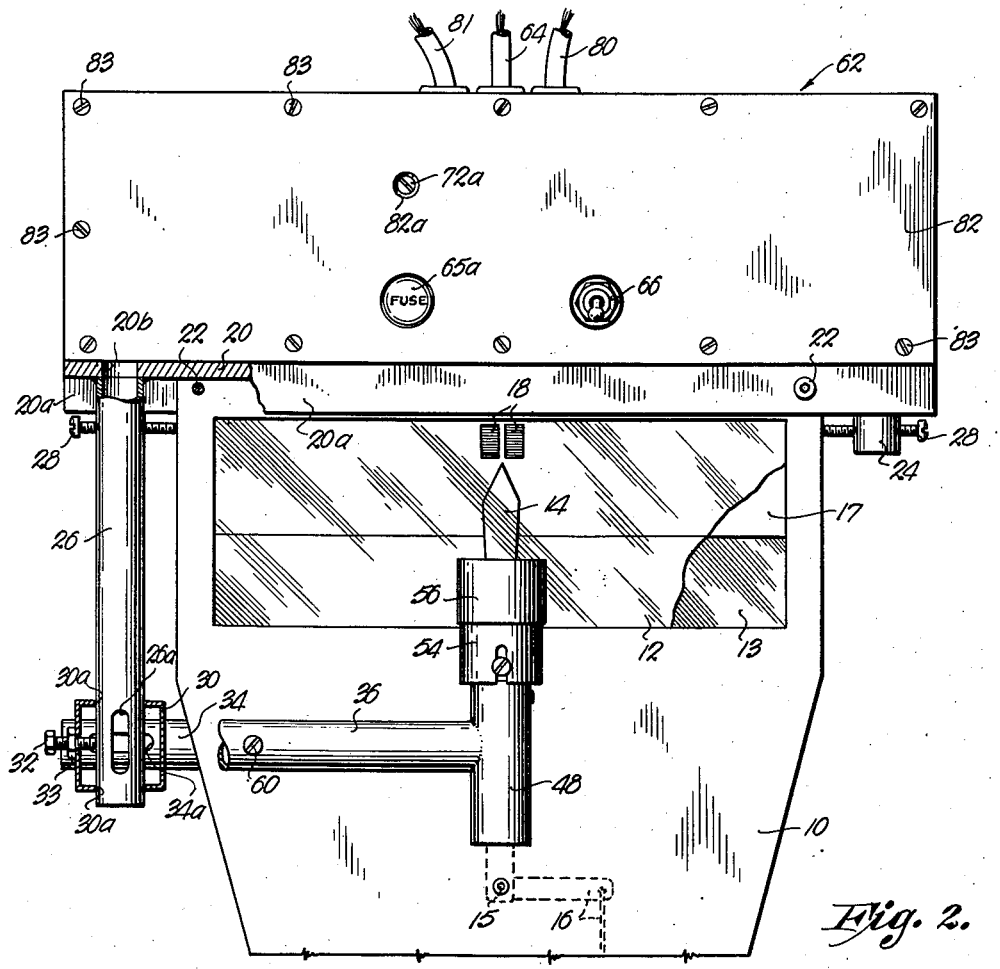
Fig. 2 is a front elevational view of said device, showing same mounted on the pointer housing of a typical scale, parts having been broken away for purposes of illustration.

Referring more particularly to Figs. 2 and 3, the numeral 10 indicates the housing of a conventional mechanically operated indicator, the particular one shown being widely used in connection with stockyard scales and other large platform scales of the balance-beam type. The housing is closed on the top and all sides, but its front and rear walls contain windows 12, 13 through which the swingable pointer 14 can be seen. The pointer is mounted to turn on the pivot 15 under control of linkage 16 connecting it to the beam of the scale. The nature of the operating mechanism for the pointer is not of importance here; suffice it to say that while it differs in detail from that shown in Spinks Patent 1,576,375, its mode of operation is generally the same. Whenever the scale is correctly balanced, in other words, the pointer 14 will be held in vertical position as shown in Fig. 2, but if proper balance is not achieved, the pointer will be caused to swing to an off-center position disposed to the right or the left of the one shown. Associated with the pointer in the housing is a stationary panel 17 having suitable marks 18 to facilitate visual inspection of whether the point is or is not centered.

Figure 1:
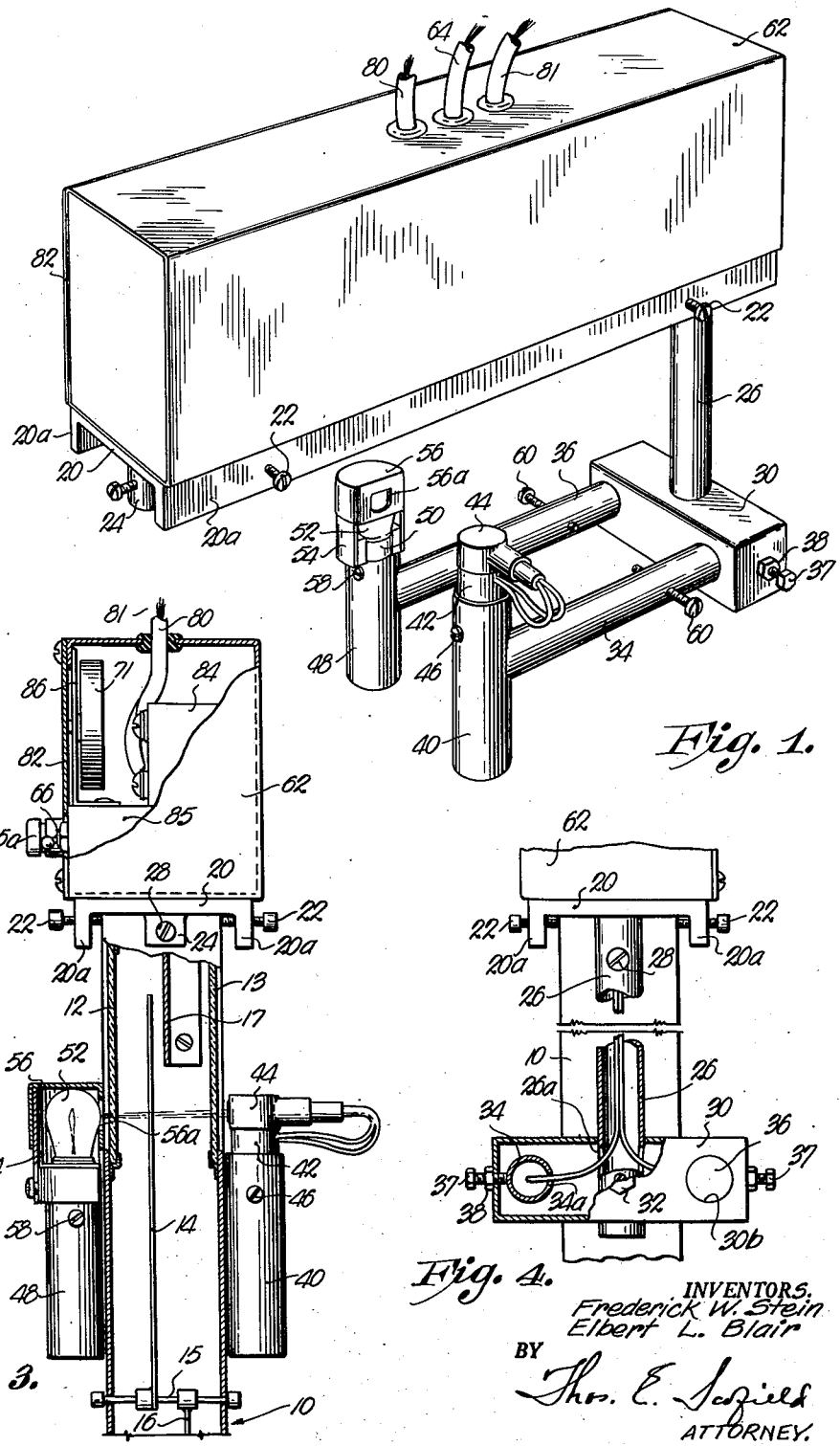
Fig. 1 is a perspective view of a unitary device embodying our invention.

Our invention involves the use of a unitary attachment or accessory whose general configuration may best be appreciated from Fig. 1, this unit being readily mountable on the exterior of the housing 10 in the manner illustrated in Figs. 2, 3 and 4. Conveniently our device employs as its main support an inverted U-shaped channel 20 adapted to seat on the flat top of the housing, with its depending flanges 20a overhanging the front and rear faces of the housing; screws 22 threaded in these flanges can be tightened against the housing to anchor the channel securely thereto.

The channel is somewhat longer than housing 10 and its outer ends have a pair of downwardly extending posts 24 and 26 welded or otherwise secured to the underside. Screws 28 threaded in these posts likewise can be tightened against the housing for clamping and anchoring purposes.

Post 24 is only a short stub, but post 26 is considerably longer so that it extends well below the level of windows 12 and 13. Its lower end extends through a hollow crosspiece 30, the latter being provided with vertically aligned apertures 30a in its upper and lower walls to permit upward and downward adjustment of the crosspiece on the post. A screw 32 threaded in the crosspiece can be tightened against the post to secure the crosspiece in adjusted position, this screw being provided with a lock nut 33 to prevent accidental loosening thereof.

Near each end, crosspiece 30 has a pair of aligned openings 30b for slidably receiving one of the horizontal arms 34, 36. Each arm can be secured to the crosspiece by means of a screw 37 threaded into the end of the latter, this screw likewise being provided with a lock nut 38 to prevent accidental loosening.

At the free end of arm 34 there is welded an upright tube 40 which telescopingly receives a smaller tube 42 carrying a photoelectric cell 44 at its upper end. A set screw 46 is employed to secure the two tubes together. Similarly, at the free end of arm 36 there is an upright tube 48 which telescopingly receives a smaller tube 50; the latter contains a socket (not shown) for a small incandescent lamp 52. For the purpose of directing light from the lamp toward the photoelectric cell in the form of a relatively narrow beam, we provide a curved reflector 54 around the opposite side of the lamp, and on this there is mounted a removable cap or hood 56 having a beam-projecting aperture 56a. It will be understood that tube 50 with its associated lamp assembly is adjustable vertically in tube 48 and can be secured in adjusted position by set screw 58.

In addition to the compactness and unitary character of our device, it is an important feature that it can be mounted very quickly and easily without the necessity of drilling any holes or otherwise mutilating the housing 10. The requisite stability—and it will be self-evident that stability over long periods of time is very essential—is achieved in large part by resting the weight of our unit on the top of the housing; the photoelectric system may be said in effect to be hung from the channel 20 which forms an inverted stirrup or hanger plate.

At the same time, this hanging of the photoelectric system is accomplished in a manner which does not interfere with normal viewing of the pointer 14 and the associated markings 18. It is important, in other words, that obstruction of window 12 is kept to a minimum, something made possible by the fact that our lamp and photoelectric cell are carried by a forklike frame assembly (i. e., members 30, 34 and 36) which straddles the housing 10 horizontally below the level of the windows, the weight of this fork being borne by post 26 which is offset laterally from the housing.

While keeping these important considerations in mind, it should also be realized that the various adjustments referred to hereinbefore permit our unit to be used on pointer housings of different external dimensions, different window dimensions, etc. As previously suggested, the horizontal fork straddling the housing below the window is bodily adjustable upwardly or downwardly upon the post 26, and, if needed, the lamp and photoelectric cell likewise can be raised or lowered relative to the legs of the fork. These legs themselves also are adjustable horizontally relative to the crosspiece 30 which forms the bight of the fork. In addition to this, the supporting channel or hanger 20 can be shifted bodily to the left or right by adjustment of the screws 28 before screws 22 are tightened.

These arrangements, in other words, make it possible to position the lamp 52 and the photoelectric cell 44 opposite one another and centrally of the windows 12 and 13 so that the beam shinning on the photocell from the lamp will be interrupted by the pointer 14 only when it is vertical as shown in Fig. 2; their position preferably is such that the beam passes through the windows at a relatively low level, leaving the upper portion of the pointer plainly in view. When properly adjusted, screws 60 threaded in the horizontal members 34 and 36 can be tightened against the housing 10 to eliminate any possible vibration of the lamp and photocell, and this of course also assists in further stabilizing the unit.

In the preferred form of our invention, the channel 20 not only serves as a hanger for the framework thus far described but also as a base for a cabinet 62 housing the other essential electrical components of the device. In this connection it will be convenient at this point to refer briefly to Fig. 5 for an understanding of the remaining components of the system and the mode of operation of our device.

The device receives its power from a 115 v. alternating current supply line 64 which is fused as shown at 65. When switch 66 is closed, this voltage is impressed upon the primary winding of transformer 67 causing lamp 52 to be energized from the low voltage secondary winding 68. The alternating current output of the remaining secondary winding 69 is fed to a conventional full-wave rectifier bridge 70 and thus converted to a direct current potential which is impressed across the potentiometer type voltage divider 71. Condenser 73 assists in smoothing the direct current output of the rectifier.

A portion of the voltage thus produced across potentiometer 71 is impressed on a series circuit comprising the winding of relay 74 in series with the photoelectric cell 44; the latter is a semi-conductor, conveniently of the type which employs a crystal of cadmium sulfide as the sensitive element. Light impinging upon cell 44 from the lamp 52 reduces its resistance to a value which, by increasing the current flow through relay 74, causes the latter to operate, closing contact 75 and opening contact 76. However, when the beam from lamp 52 is interrupted due to the fact that pointer 14 is in vertical position (Fig. 2), the increase in resistance of cell 44 will cause the relay to deenergize so that its contacts occupy the position shown in Fig. 5.

Inevitably some stray light from the surrounding room reaches cell 44 in most installations; the amount of such light and its effect upon the cell will vary from one installation to another, but compensaiton for this can easily be made by adjusting the position of the potentiometer's sliding cap 72. This adjustment also makes it possible to control the over-all sensitivity of the device so that relay 74 can be made to energize upon very slight movement of the pointer 14 off-center or only upon substantial displacement of the pointer, as desired.

In the remote location at which it is desired to give an indication of whether the scale is or is not in balance (for example, in a conspicuous place near the scale platform), we prefer to install a pair of differently colored lamps 78 and 79, one of which is designed to be lighted whenever the scale is in balance and the other of which is designed to be lighted when the scale is not in balance. Thus when relay 74 is de-energized due to pointer 14 being in vertical position (Fig. 2), it will be seen that contact 76 completes an obvious circuit for supplying 115 volts alternating current via lines 64, 77 and 81 to the "green" lamp 79 to indicate the scale is balanced. Contact 75 maintains the circuit of the "red" lamp 78 open under this condition. On the other hand, whenever relay 74 is energized due to pointer 14 moving off-center, contact 75 completes an obvious circuit via lines 64, 77 and 80 for lighting the "red" lamp, while at the same time the opening of contact 76 interrupts the circuit to the "green" lamp.

If it is desired that the signal thus produced by lamps 78 and 79 be duplicated at other remote locations, other pairs of lamps connected in multiple with 78 and 79 may be provided at the other locations. Also, it will be understood that, if desired, an audible signal (e. g., a bell, buzzer, horn or the like) can be substituted for one or both lamps at any given remote location.

Figure 5:
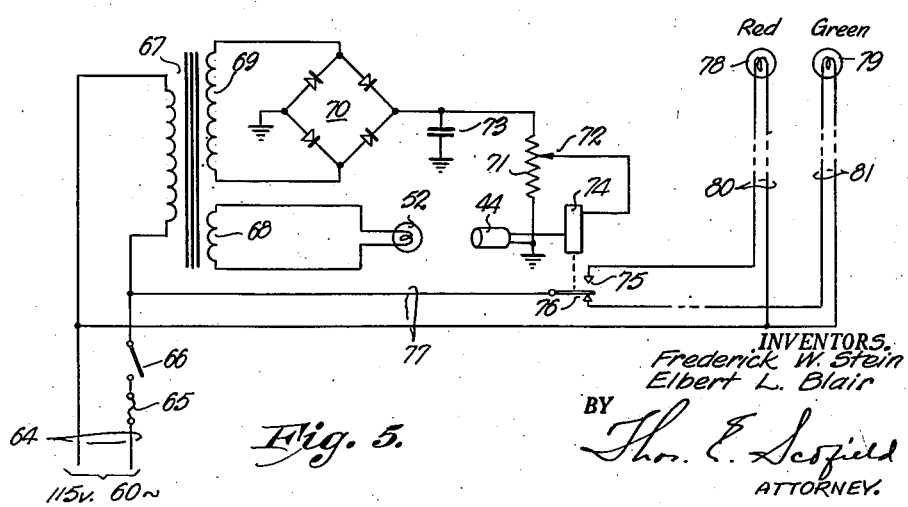
Fig. 5 is a schematic diagram of the circuits employed in our invention.

With the exception of the remote signal devices (lamps 78 and 79 or their equivalent), all of the apparatus shown in Fig. 5 is incorporated in the self-contained unitary device shown in Figs. 1 and 2. As previously explained, the photoelectric cell 44 and its associated lamp 52 are carried by the framework below the channel 20, and it will be understood that the remaining components are housed within the cabinet 62 which is carried on top of this channel. Accordingly, installation of our device only requires mounting the unit on the pointer housing 10 and connecting to it the incoming power supply line 64 and outgoing lines 80 and 81 which extend to the remote signals. To facilitate this, cabinet 62 is provided with a removable cover plate 82 normally held in place by screws 83; removal of the cover gives access to an insulated terminal block 84 carried on an internal chassis 85 (see Fig. 3). After being inserted through grommeted openings in the top of the cabinet, lines 64, 80 and 81 can quickly and easily be connected to this terminal block, which is the only wiring required at the installation site.

In the interest of simplicity, most of the components contained in cabinet 62 have been omitted from Fig. 3, but it will be understood that these are mounted on the upper or lower side of chassis 85. Potentiometer 71, for example, is carried on a suitable bracket 86; for adjustment thereof, its shaft 72a is provided with a screwdriver slot which is accessible through a registering aperture 82a in the cover of the cabinet. Switch 66 and the fuse receptacle 65a are permanently mounted on the forward edge of the chassis so as to project through similar openings in the cabinet cover when the latter is in place.

For the sake of simplicity and clarity, the wiring by which the photoelectric cell 44 and the lamp 52 are connected to the chassis has been omitted from Fig. 2. It will be understood, however, that this wiring extends from the underside of the chassis downwardly into the hollow post 26 through a registering opening 20b in the channel 20. Thence, referring to Fig. 1, the wiring branches to the left and to the right in the hollow cross member 30, half of it entering the hollow tube 34 and terminating at the photocell 44 while the other half enters the hollow tube 36 and terminates at the lamp 52. As will be clear from Figs. 4 and 2, the wiring passes from the interior of post 26 to the interior of tube 34 via a vertically elongated opening 26a in the former and a horizontally elongated opening 34a in the latter, a similar arrangement being employed in the case of the wiring extending from post 26 to the interior of tube 36. The openings in these hollow members are, in each case, elongated in the direction of the permissible adjustment of the member relative to the crosspiece 30 so that the wires extending therethrough will not in any way interfere with such adjustments.

While, as has been suggested, we prefer that cabinet 62 be mounted on the upper side of the hanger or channel member 20 in order that our attachment may be a wholly self-contained unit, occasions may arise where the available space above the top of the pointer housing 10 is not sufficient to permit this. In such instances the cabinet (which conveniently is attached to channel 20 by screws) can be removed and mounted separately in a near-by location; this merely will require the use of longer conductors between the upper end of post 26 and the underside of the cabinet. Also, while our inventive attachment has been described and explained with particular reference to its use in giving a remote indication of whether a large platform scale is or is not in balance, it will be self-evident that it may be applied equally well to other "moving pointer" devices or mechanisms which have viewing windows disposed in generally the same fashion as disclosed herein.

Inasmuch as various possible embodiments of the invention may be made without departing from the scope thereof, it should be understood, of course, that all matter herein set forth or shown in the accompanying drawings is to be interpreted as illustrative and not in a limiting sense.

It has been seen from the foregoing that our invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Having thus described our invention, we claim:

1. In a device for use with a mechanism housing of the type having opposite side openings or windows, a unitary frame comprising a hanger portion seatable on the top of the housing and an integral fork portion below said hanger portion, the legs of said fork portion being constructed and arranged to straddle said housing when the hanger portion is seated on the top thereof, a photoelectric cell carried by one of said legs and a lamp carried by the other leg in a position to project a beam through the housing onto said cell, a remote signaling circuit, and means controlled by said cell for altering said circuit in accordance with whether said beam is or is not interrupted by mechanism within said housing.

2. A device as in claim 1 having an adjustable connection between said forked portion of the frame and said hanger portion thereof, whereby said forked portion is adjustable vertically relative to said hanger portion.

3. A device as in claim 1 wherein said frame includes means adjustably connecting the legs of said forked portion to said hanger portion of the frame thereby to permit lateral adjustment of said lamp and cell relative to said hanger portion.

4. In a device for use with a mechanism housing of the type having opposite side openings or windows, a unitary frame comprising an elongate support portion seatable on the top of the housing, a downwardly projecting post portion at one end of said support portion and a horizontally disposed fork portion at the lower extremity of said post portion, the legs of said fork portion being constructed and arranged to straddle said housing below the level of said support portion when the latter is seated on the top of the housing and below said windows, a photoelectric cell carried by one of said legs and a lamp carried by the other leg in a position to project a beam of light through the housing windows onto said cell, a remote signaling circuit, and means controlled by said cell for altering said circuit in accordance with whether said beam is or is not interrupted by mechanism within said housing.

5. A device as in claim 1 having means for fixedly securing said frame to said housing, said securing means adjustable to vary the position of said forked portion of the frame relative to the housing.

References Cited in the file of this patent

UNITED STATES PATENTS

| | | |
|---|---|---|
| 1,880,562 | Weckerby | Oct. 4, 1932 |
| 2,383,321 | Kleber | Aug. 21, 1945 |
| 2,464,191 | Wen | Mar. 8, 1949 |
| 2,771,597 | Freedman | Nov. 20, 1956 |